United States Patent
Froeschle et al.

(10) Patent No.: US 7,380,871 B2
(45) Date of Patent: Jun. 3, 2008

(54) AIR GUIDING SYSTEM FOR A VEHICLE

(75) Inventors: Mathias Froeschle, Ostfildern (DE); Joachim Paul, Stuttgart (DE)

(73) Assignee: Dr. Ing.h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/727,615

(22) Filed: Mar. 27, 2007

(65) Prior Publication Data

US 2007/0236044 A1    Oct. 11, 2007

(30) Foreign Application Priority Data

Mar. 28, 2006  (DE) ...................... 10 2006 014 261

(51) Int. Cl.
*B62D 35/00*  (2006.01)
(52) U.S. Cl. ................ 296/180.5; 180/903; 296/26.12; 296/180.1
(58) Field of Classification Search ................. 105/1.2; 180/903; 244/213; 296/26.01, 26.12, 26.13, 296/180.1, 180.2, 180.3, 180.4, 180.5
See application file for complete search history.

(56) References Cited

U.S. PATENT DOCUMENTS

| | | | | |
|---|---|---|---|---|
| 1,274,986 A | * | 8/1918 | Carolin ...................... 244/213 |
| 1,762,002 A | * | 6/1930 | Van De Putte .............. 244/213 |
| 3,791,468 A | * | 2/1974 | Bryan, Jr. .................. 180/69.2 |
| 4,773,692 A | * | 9/1988 | Schleicher et al. ....... 296/180.5 |
| 4,925,236 A | * | 5/1990 | Itoh et al. ................ 296/180.5 |
| 5,013,081 A | * | 5/1991 | Cronce et al. ........... 296/180.1 |
| 5,074,612 A | | 12/1991 | Liese et al. |
| 5,120,105 A | * | 6/1992 | Brin et al. ................ 296/180.5 |
| 5,536,062 A | * | 7/1996 | Spears ..................... 296/180.3 |
| 6,382,708 B1 | | 5/2002 | Erdelitsch et al. |
| 2002/0074826 A1 | * | 6/2002 | Presley ................... 296/180.1 |
| 2007/0001482 A1 | | 1/2007 | Larson |
| 2007/0001485 A1 | | 1/2007 | Larson |

FOREIGN PATENT DOCUMENTS

DE          30 19 150 A1     11/1981

(Continued)

OTHER PUBLICATIONS

German Office Action dated Dec. 7, 2006 with English translation (Six (6) pages).

(Continued)

*Primary Examiner*—D. Glenn Dayoan
*Assistant Examiner*—Paul A Chenevert
(74) *Attorney, Agent, or Firm*—Crowell & Moring LLP

(57) ABSTRACT

An air guiding system for a vehicle, particularly for a passenger car, is arranged in a rear area of the vehicle and has at least one central main air guiding element that can be displaced between a moved-in inoperative position and a moved-out operative position. Lateral auxiliary air guiding elements are displaceable together with the central main air guiding element. The auxiliary air guiding elements can be adjusted with respect to the main air guiding elements essentially linearly or translatorily in a direction transversely to the longitudinal direction of the vehicle in order to move them from an also moved-in inoperative position into an also moved-out operative position. Each auxiliary air guiding element is guided in a guiding device and is movable along the latter.

10 Claims, 3 Drawing Sheets

FOREIGN PATENT DOCUMENTS

| | | |
|---|---|---|
| DE | 43 05 090 A1 | 8/1994 |
| DE | 10 2004 030 571 A1 | 1/2006 |
| DE | 10 2005 030 203 A1 | 1/2007 |
| EP | 271757 A2 * | 6/1988 ................. 244/46 |
| EP | 0 429 776 A1 | 6/1991 |
| EP | 1 118 529 A2 | 7/2001 |
| EP | 1 138 582 A2 | 10/2001 |
| EP | 1 738 996 A2 | 1/2007 |
| JP | 60163773 A * | 8/1985 .............. 296/180.5 |
| JP | 03000578 A * | 1/1991 .............. 296/180.1 |
| JP | 03281484 A * | 12/1991 .............. 296/180.1 |
| WO | WO97/32770 A1 | 9/1997 |

OTHER PUBLICATIONS

European Search Report dated Jul. 5, 2007 Including English translation of the pertinent portion (Seven (7) pages).

* cited by examiner

AIR GUIDING SYSTEM FOR A VEHICLE

CROSS REFERENCE TO RELATED APPLICATIONS

This application claims the benefit of priority under 35 U.S.C. § 119 to German Patent Application No. 10 2006 014 261 filed Mar. 28, 2006, the disclosure of which is incorporated herein by reference in its entirety.

BACKGROUND AND SUMMARY OF THE INVENTION

The invention relates to an air guiding system for a vehicle, particularly for a passenger car, which is arranged in a rear area of the vehicle and comprises at least one central main air guiding element, which can be displaced from a moved-in inoperative position into a moved-out operative position, lateral auxiliary air guiding elements being displaceable together with the or each central main air guiding element.

DE 30 19 150 A1 shows a vehicle air guiding system arranged in an upper rear area of the vehicle and having an air guiding element that can be displaced from an inoperative position, in which it is integrated in the shaping of the rear area flush with the surface, into a moved-out operative position. The air guiding element is constructed as an aerofoil which, by way of an operating device, can be displaced or changed between the inoperative position into the operative position.

DE 43 05 090 A1 also discloses a vehicle air guiding system for a vehicle, arranged in a rear area of the vehicle and having an air guiding element that can be displaced from an inoperative position into a moved-out operative position. The air guiding element is formed by a rear spoiler arranged in a recessed receiving device of the vehicle body and can be displaced by an operating device between the inoperative position and the operative position.

The air guiding systems known from the above-mentioned DE 30 19 150 A1 and DE 43 05 090 A1 increase the rear axle output coefficient ($c_{ah}$-value) of the motor vehicle while maintaining the same or even improving the drag coefficient ($c_w$-value) these known air guiding elements each having the same transverse dimension in the inoperative position and in the operative position.

Yet unpublished DE 10 2005 030 203, discloses a vehicle air guiding system having a central main air guiding element as well as two lateral auxiliary air guiding elements. The auxiliary air guiding elements allow the transverse dimension of the air guiding system to be enlarged in the operative position and particularly the rear axle output coefficient to be further increased. The adjusting movement of the lateral auxiliary air guiding elements with respect to the central main air guiding element takes place when the main air guiding element has been displaced from the inoperative position into the operative position. The adjustment of the auxiliary air guiding elements with respect to the main air guiding element therefore takes place after, and uncoupled from, the displacement of the main air guiding element.

An object of the present invention is to provide a novel vehicle air guiding system in which the auxiliary air guiding elements can essentially be linearly or translatorily adjusted with respect to the at least one main air guiding element in a direction transversely to the longitudinal direction of the vehicle in order to change these from an also moved-in inoperative position into an also moved-out operative position. Each auxiliary air guiding element is guided in a guiding device and is movable along the latter.

According to an advantageous further development of the invention, in the air guiding device according to the invention, the adjustment of the lateral auxiliary air guiding elements is coupled to the displacement of the at least one central main air guiding element during its or their change between the inoperative position and the operative position. Thereby, the lateral auxiliary air guiding elements can be changed isochronously or simultaneously with the displacement of the, or each, central main air guiding element with respect to the, or each, central main air guiding element from the inoperative position into the operative position and from the operative position into the inoperative position, respectively. In this case, the lateral auxiliary air guiding elements are adjusted with respect to the at least one central main air guiding element only linearly or translatorily transversely to the vehicle longitudinal direction. Within a very short time and in a simple manner, the transverse dimension of the air guiding system according to the invention can thereby be adapted.

Preferably, an operating device is associated with the auxiliary air guiding element for the latter's linear displacement with respect to the at least one central main air guiding element. A coupling device is applied to the respective operating device to couple the linear adjustment of the respective auxiliary air guiding element with respect to the at least one central main air guiding element to the displacement of the latter main air guiding element.

Other objects, advantages and novel features of the present invention will become apparent from the following detailed description of the invention when considered in conjunction with the accompanying drawings.

DETAILED DESCRIPTION OF THE DRAWINGS

Figure 1:
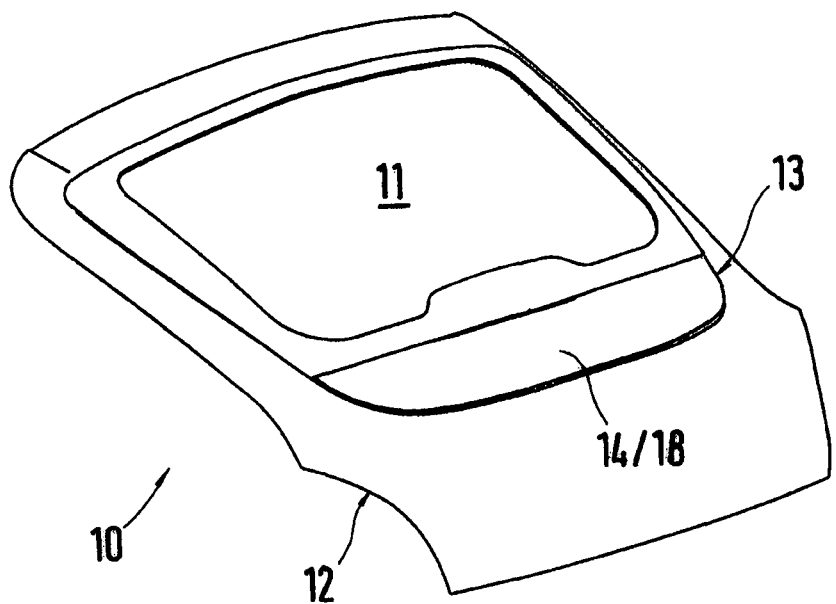
FIG. 1 is a perspective view diagonally from the rear of a rear area of a vehicle with an air guiding system according to the present invention in the inoperative position.
Figure 2:
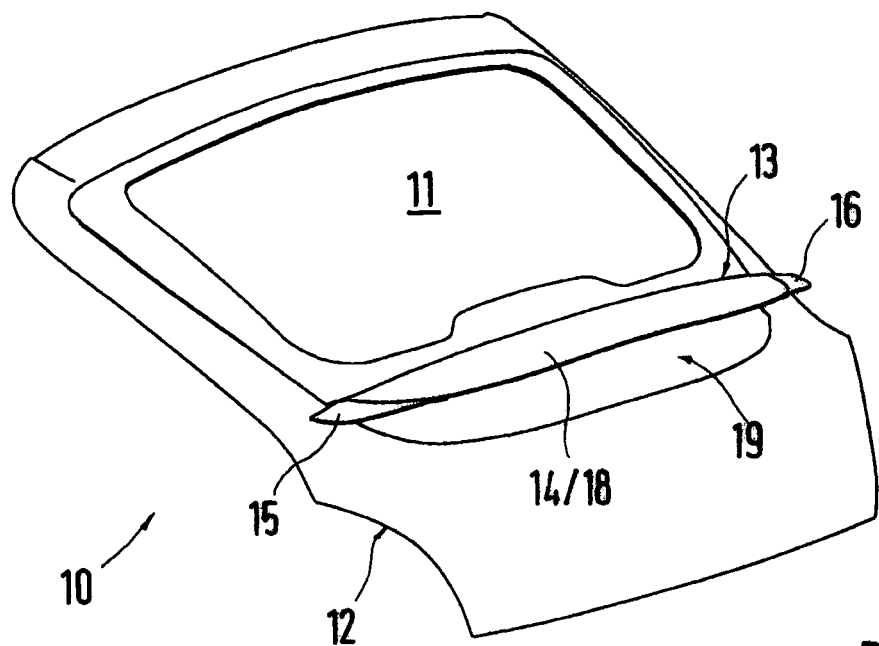
FIG. 2 is a view analogous to FIG. 1 but with air guiding system in the operative position.
Figure 3:
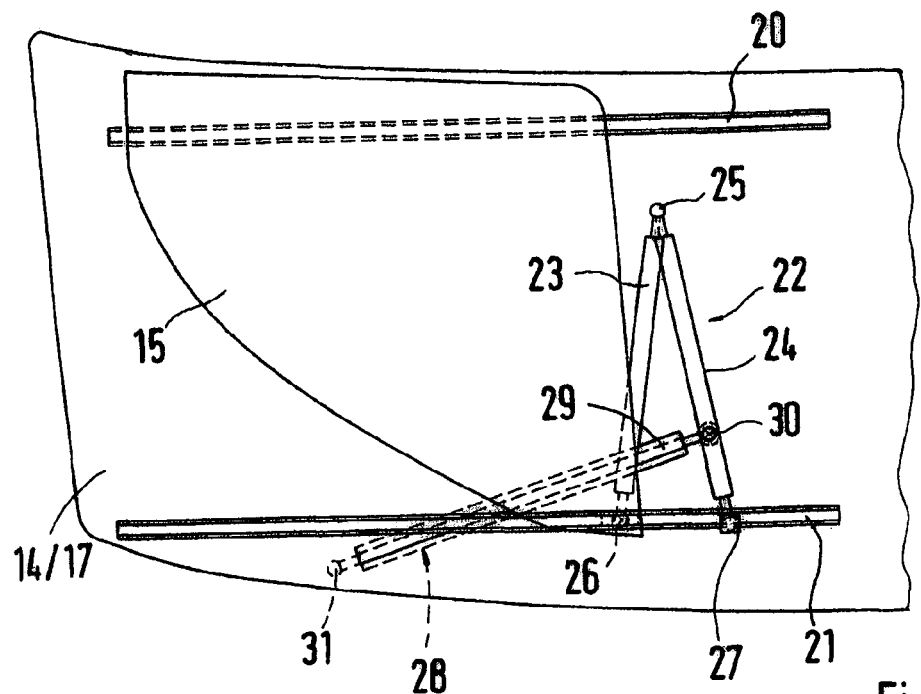
FIG. 3 is a schematic plan view of a cutout of the air guiding system according to the invention in the inoperative position shown in FIG. 1.
Figure 4:
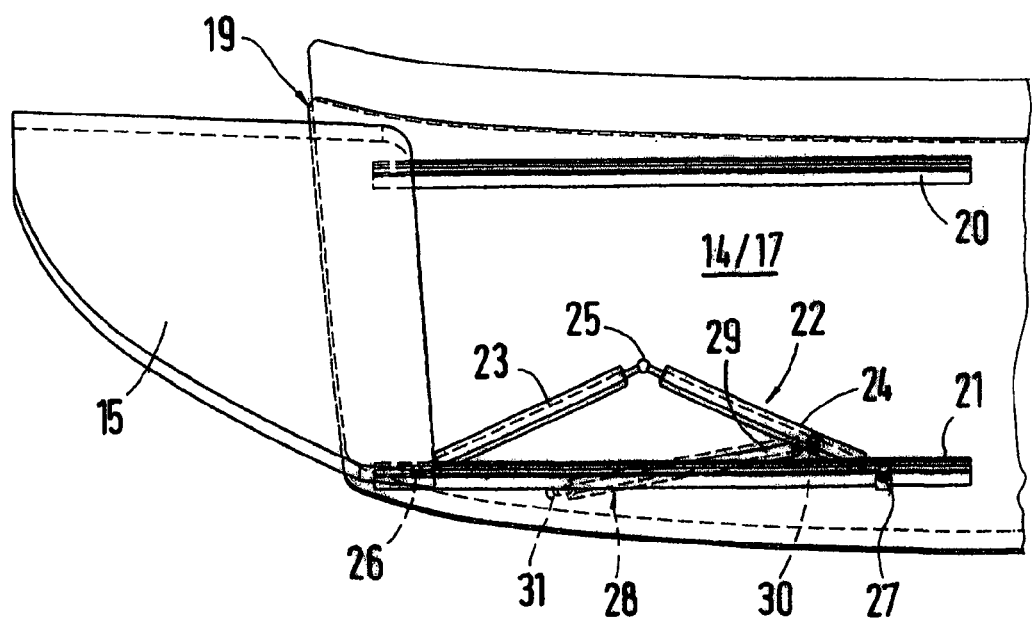
FIG. 4 is a view analogous to FIG. 3 of a cutout of the air guiding system according to the invention but in the operative position shown in FIG. 2.
Figure 5:
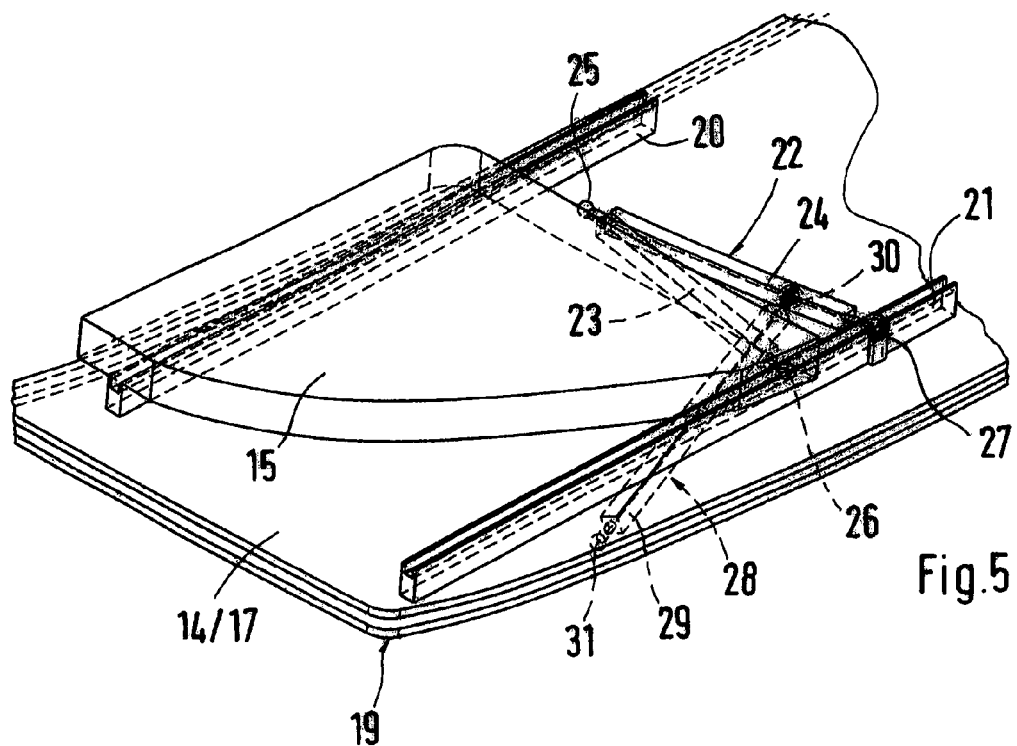
FIG. 5 is a schematic perspective view diagonally from the rear of a cutout of the air guiding system according to the invention in the inoperative position shown in FIGS. 1 and 3.
Figure 6:
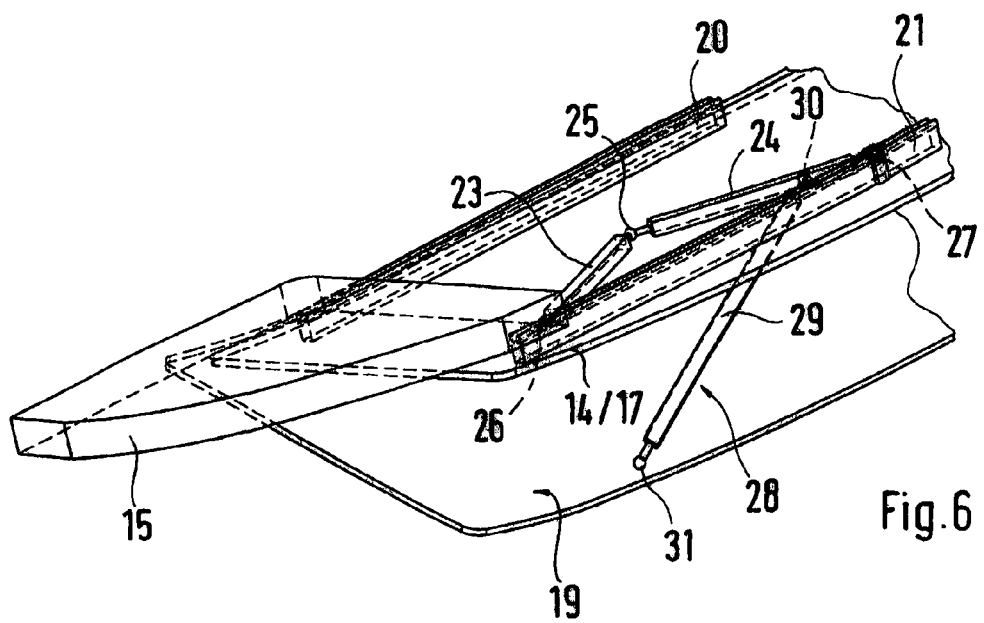
FIG. 6 is a view analogous to FIG. 5 of a cutout of the air guiding system according to the invention but in the operative position shown in FIGS. 2 and 4.

FIGS. 1 and 2 are perspective views of a vehicle body rear area 10 having a rear window 11 that is surrounded by a vehicle body part 12 in the front, at the rear, as well as on the sides. An air guiding system designated generally by numeral 13 is positioned in a rearward area of the vehicle body part 12 of the rear area 10 configured in the manner of a fastback, and therefore below the rear window 11. FIG. 1 shows the air guiding system 13 in an inoperative position, and FIG. 2 shows the latter in an operative position. In the inoperative position of the air guiding system 13, the latter is integrated flush with the surface in the rear area 10 of the vehicle. In contrast, in the operative position of the air guiding system 13, the latter is moved out of the surface contour of the rear area 10.

In the illustrated embodiment, the air guiding system 13 according to the invention has a central main air guiding element 14 as well as two lateral auxiliary air guiding elements 15, 16. One of the lateral auxiliary air guiding elements 15, 16, respectively, is arranged on each side of the central main air guiding element 14. The lateral auxiliary air guiding elements 15, 16 are visible only in the operative position (see FIG. 2) of the air guiding system 13. In the inoperative position, the lateral auxiliary air guiding elements 15, 16 are covered by the central main air guiding element 14.

During the change or displacement from the inoperative position into the operative position or from the operative position into the inoperative position, the central main air guiding element 14 is swiveled and thereby lifted or lowered. The two auxiliary air guiding elements 15, 16 go along in this movement of the central main air guiding element 14.

In the illustrated preferred embodiment of the invention, the lateral auxiliary air guiding elements 15, 16 can isochronously or simultaneously with the swivel-type displacement of the central main air guiding element 14 from the inoperative position (see FIG. 1) into the operative position (see FIG. 2) be changed with respect to the central main air guiding element from an also moved-in inoperative position into an also moved-out operative position. The auxiliary air guiding elements 15, 16 are adjustable with respect to the main air guiding element 14 only linearly or translatorily in a direction transversely to the vehicle longitudinal direction. This coupled adjustment of the main air guiding element 14 and the auxiliary air guiding elements 15, 16 will be discussed hereinafter in greater detail with reference to FIGS. 3 to 6.

FIGS. 3 to 6 show one of the two lateral auxiliary air guiding elements 15, that is disposed on a carrier element 17 of the central main air guiding element 14. In the inoperative position (see FIGS. 1, 3, 5), the lateral auxiliary air guiding element 15 is covered by a covering element 18 (FIGS. 1 and 2), so that the lateral auxiliary air guiding element 15 is not visible in the inoperative position of the air guiding system 13. In addition to the auxiliary air guiding element 15 and the carrier element 17 of the main air guiding element 14, FIGS. 2, 4 to 6 also show a recessed receiving device 19 of the vehicle body part 12 of the rear area 10. The air guiding system 13 according to the invention in the inoperative position being accommodated in the recessed receiving device 19 such that the covering element 18 integrates the air guiding system 13 flush with the surface in the shaping of the rear area 10.

According to FIGS. 3 to 6, the illustrated lateral auxiliary air guiding element 15 is guided in a guiding device formed by two guide rails 20, 21, mounted on the carrier element 17 of the main air guiding element 14 and extending transversely to the longitudinal direction of the vehicle, specifically approximately perpendicularly to the vehicle longitudinal direction. The auxiliary air guiding element 15 is disposed on the guide rails 20, 21 and can be moved linearly or translatorily along the latter. The guide rails may also be curved in order to impose an additional motion component on the linear displacement transversely to the longitudinal direction of the motor vehicle. Furthermore, the guide rails may be replaced by a connecting link guide within the scope of the present invention.

For the linear displacement or movement of the auxiliary air guiding element 15 illustrated in FIGS. 3 to 6 with respect to the main air guiding element 14, an operating device 22 is associated with the auxiliary air guiding element 15. The operating device 22 is formed by two operating elements 23 and 24 in the illustrated embodiment. The operating elements 23 and 24 will be called operating rods but can also be called operating guide rods.

Adjacent ends of the two operating rods 23, 24 are connected with one another in an articulated manner by a joint 25. The first joint rod 23 is also connected at the end situated opposite the joint 25 by a joint 26 with the lateral auxiliary air guiding element 15, whereas a second joint rod 24 is connected at the end situated opposite the joint 25 by a joint 27 with the central main air guiding element 14 in an articulated manner, particularly with the guide rail 21 of the guiding element arranged on the carrier element 17 of the central main air guiding element 14.

A comparison of FIGS. 3 to 6 illustrates that, in the inoperative position and in the operative position of the lateral auxiliary air guiding element 15, the joint 27 is in each case arranged in the same position and therefore has a stationary construction. In contrast, during the change of the lateral auxiliary air guiding element 15 from the inoperative position (see FIGS. 3 and 5) into the operative position (see FIGS. 4 and 6), the joints 25, 26 change their position relative to the guide rail 21.

For coupling the linear motion of the lateral auxiliary air guiding element 15 with respect to the central main air guiding element 14 to the displacement of the central main air guiding element 14 from the inoperative position into the operative position or from the operative position into the inoperative position, a coupling device 28 comprised of a coupling element 29 is applied to the operating device 22 of the lateral auxiliary air guiding element 15.

In the following the coupling element 29 will be called a coupling rod, but can also be called a coupling guide rod. By way of a first end, the coupling rod 29 is applied via a joint 30 to one of the two operating rods 23, 24, respectively, and at an opposite second end, is applied via a joint 31 to the receiving device 19 of the vehicle body part 12 of the rear area 10. When the main air guiding element 14 is displaced by swiveling from the inoperative position illustrated in FIGS. 3 and 5 into the operative position illustrated in FIGS. 4 and 6, the coupling rod 29 transfers this movement to the operating device 22 and thereby to the lateral auxiliary air guiding element 15. This, in turn, displaces the lateral auxiliary air guiding elements 16 simultaneously or isochronously with respect to the displacement of the main air guiding element 14 so as to be coupled to the displacement of the main air guiding element 14 linearly or translatorily in the direction of the guide rails 20, 21 and thus transversely to the longitudinal direction of the vehicle with respect to the main air guiding element 14.

The operating rods or joint rods 23, 24 provide a translation which is required for generating the path for the moving-out of the auxiliary air guiding elements 15, 16 from the rotating or swinging motion of the main air guiding element 14. If the adjustment of the main air guiding element 14 with respect to the receiving device 19 is large enough, the operating rods or joint rods 23, 24 can be eliminated and the coupling rods 29 can be linked by the joints 30 directly to the auxiliary air guiding elements 15 and 16.

As mentioned above, in the illustrated embodiment, the lateral auxiliary air guiding elements 15, 16 are covered in the inoperative position by the central main air guiding element 14 and are therefore not visible. As an alternative, it is also contemplated that the auxiliary air guiding elements 15, 16 are visible in the inoperative position, by being arranged above a covering element 18 of the main air guiding element 14.

In the illustrated embodiment, the coupling between the displacement of the main air guiding element 14 and the displacement of the auxiliary air guiding elements 15, 16 is implemented mechanically by the coupling device 28. In this case, only a single drive will be required for the air guiding system 13.

As an alternative, it is also contemplated to associate a separate drive to the auxiliary air guiding element for their adjustment. Then, the coupling between the displacement of the main air guiding element and the linear displacement of the auxiliary air guiding elements with respect to the main air guiding element does not take place mechanically as shown in FIGS. 3 to 6 but on the control side by a control-side coupling of the drive of the main air guiding element and the drive(s) for the auxiliary air guiding elements. In this case, the auxiliary air guiding elements can then also be moved uncoupled from the main air guiding element in order to carry out the adjusting movements of the main air guiding element and the auxiliary air guiding elements, for example, successively. Likewise, for example, speed-dependent adjustments of the auxiliary air guiding elements can in this case be implemented which are independent of a speed-dependent adjustment of the main air guiding element.

Furthermore, it is pointed out that the operating device 22 for the linear displacement of the auxiliary air guiding elements 15, 16 with respect to the main air guiding element 14, in contrast to the illustrated embodiment, can also be provided by way of a four-bar linkage.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle air guiding system in a vehicle rear area, comprising at least one central main air guiding element displaceable between a moved-in inoperative position and a moved-out operative position, and lateral auxiliary air guiding elements displaceable together with the at least one central main air guiding element, wherein the auxiliary air guiding elements are arranged to be adjusted with respect to the at least one main air guiding element substantially linearly or translatorily in a direction transversly to the longitudinal direction of the vehicle in order to be displaced from an also moved-in inoperative position into an also moved-out operative position, with each of the auxiliary air guiding elements being guided in and movable along a guiding device;

wherein an operating device is operatively associated with each of the auxiliary air guiding elements for linear displacement thereof with respect to the at least one central main air guiding element; and wherein the operating device has at least two operating elements mutually and articulately connected.

2. The vehicle air guiding system according to claim 1, wherein the guiding devices extend transversely with respect to a longitudinal direction of the vehicle.

3. The vehicle air guiding system according to claim 1, wherein the guiding devices extend transversely to the longitudinal direction of the vehicle and are curved.

4. The vehicle air guiding system according to claim 1, wherein the guiding devices are fixedly connected with the at least one central main air guiding element.

5. The vehicle air guiding system according to claim 1, wherein the operating device comprises a first operating element articulatingly connected with a respective one of the auxiliary air guiding elements, and a second operating element is articulatingly connected with the central main air guiding element or with the guiding device on which the respective auxiliary air guiding element is disposed.

6. The air guiding system according to claim 1, wherein the auxiliary air guiding elements are arranged to be changed isochronously or simultaneously with the displacement of the at least one central main air guiding element from the also moved-in inoperative position into the also-moved out operative position.

7. The vehicle air guiding system according to claim 5, wherein a coupling device is operatively associated with the operating device and mechanically couples linear adjustment of the auxiliary air guiding elements relative to the at least one center main air guiding element to the displacement of the at least one main air guiding element.

8. The vehicle air guiding system according to claim 7, wherein the coupling device comprises a coupling element having one side articulatingly connected with an operating element of the operating device and another side articulatingly connected with a vehicle body part.

9. The vehicle air guiding system according to claim 1, wherein separate drives are associated with the auxiliary air guiding elements and the at least one central main air guiding element.

10. The vehicle air guiding system according to claim 1, wherein the auxiliary air guiding elements are arranged underneath the main air guiding element main air guiding inoperative position so as to be hidden or are arranged above the at least one central main air guiding element in the main air guiding element's operative position so as to be visible.

* * * * *